May 7, 1968 H. EISENHARDT 3,381,558
MACHINE TOOLS
Filed May 16, 1966 5 Sheets-Sheet 1

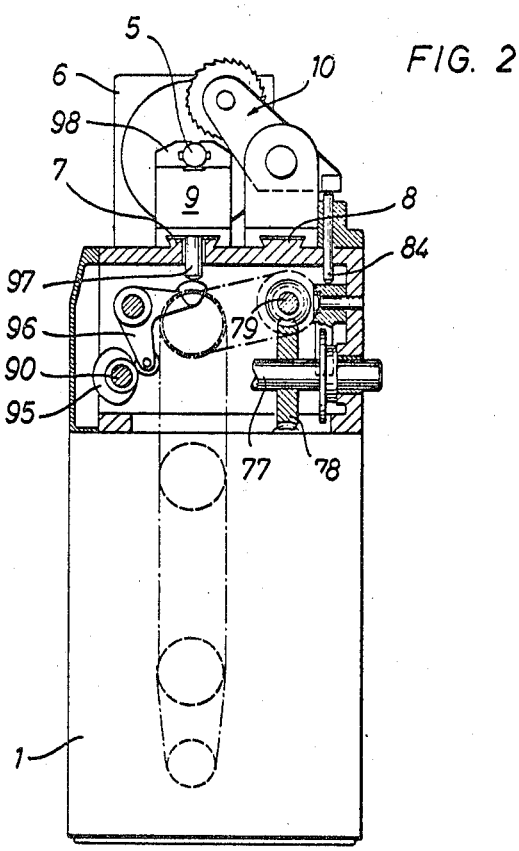

3,381,558
MACHINE TOOLS

Horst Eisenhardt, Stuttgart-Unterturkheim, Germany, assignor to Gebr. Wendler G.m.b.H., Reutlingen, Germany, a corporation of Germany
Filed May 16, 1966, Ser. No. 550,205
Claims priority, application Germany, May 19, 1965,
E 29,345
4 Claims. (Cl. 82—20)

My invention relates to machine tools.

More particularly, my invention relates to that type of lathe which can be automatically operated and in which the work remains stationary while it is machined.

The work may take the form of a wire or rod and is adapted to extend through a hollow tool carrier as well as through a main drive spindle of the machine tool. This drive spindle carries a rotary tool-carrying means on which at least one cutting tool is mounted. In the particular type of machine to which my invention relates, the cutting tool is carried by a lever of the tool carrying means, and this lever is turnably mounted on the tool carrying means for swinging movement about an axis which is parallel to the spindle axis. During rotation of the tool carrying means the lever which carries the cutting tool is turned so as to move the cutting tool radially toward and away from the work, and this turning of this latter lever is derived from a rotary cam means which is coaxial with the main spindle.

In machine tools of this general type, each cutting tool carried by the rotary tool carrier carries out a single working stroke either when the lever which carries the cutting tool overtakes and turns with respect to the rotary cam means or when the rotary cam means overtakes the lever and moves with respect to the latter. During the course of each relative rotation between a rotary cam spindle which carries the rotary cam means and the main spindle which drives the tool carrier, the workpiece is machined. This type of operation assumes, of course, that the cam which operates on the tool-carrying lever has at its camming surface only a single camming projection. In the event that the rotary cam means has a plurality of identical and uniformly distributed camming projections, angularly distributed about the axis of the main spindle, then of course there will be a greater number of working strokes for the cutting tool at each revolution of the rotary cam means and the rotary tool carrying means one with respect to the other. For a given number of camming projections of the cam means, the duration required for each working cycle, and thus the duration required for an operating cycle of the machine tool, will be shorter as the difference between the speed of rotation of the main spindle and the cam-carrying spindle becomes greater. In other words, the greater this latter speed differential, the shorter the time for each operating cycle, where there is a predetermined number of camming projections on the cam which actuates the lever which carries the cutting tool.

Thus, with machine tools of this type there is the problem of providing a step-down transmission ratio between the main spindle, which drives the tool carrier, and the cam spindle, which drives the rotary cam means, at an extremely small value which, according to the characteristics of the work which is to be machined can be on the order of from 100:99 up to less than 2000:1999, so as to achieve in this way a sufficient number of rotations of the tool carrier to produce the required machining of the work.

While machine tools of the above type are known, as exemplified by Swiss Patent 260,918, for example, the known machine tools of this type suffer from various drawbacks. Thus, with a known construction of this type the rotary cam means which is coaxial with the main drive spindle is in the form of a planetary gear carrier which sets of planetary gears with two different sets of gear teeth are supported for rotary movement. One of the types of planetary gears of the sets of planetary gears meshes with a sun gear of the rotary tool-carrying means while the second type of planetary gearing meshes with a stationary sun gear situated at a part of the spindle stock.

With this latter known construction, the required extremely small step-down transmission ratio between the tool carrying means and the cam means, therefore can be achieved only with sun gears and/or planetary gears which have an extremely large number of teeth and, for a given tooth modulus, an extremely large diameter. As a result, the largest possible speed of rotation of the tool carrying means of these known machine tools is limited to such an extent that these known machines are not suitable for the economical and practical machining of work in the form of wire or rods.

It is therefore a primary object of my invention to provide a machine tool of the above general type which is capable of machining in a practical, economical manner workpieces such as wires or rods.

Also, it is an object of my invention to provide a machine tool of this type which can also be used for machining relatively complex workpieces which require a relatively large number of revolutions of the tool-carrier in order to produce the required machining.

Thus, in order to achieve the required economy of operation, it is an object of my invention to provide a machine tool of the above general type which enables the rotary tool carrier to rotate at high speed.

At the same time, it is an object of my invention to provide a drive for the cam-carrying spindle which is sufficiently robust so that it is possible to provide large radial cutting pressures during advance of the cutting tools into the work.

In accordance with my invention the cam-carrying spindle means and the main spindle are respectively connected with a pair of sun gears of a planetary gearing which includes planetary gears providing a transmission ratio between the sun gears, the planetary gearing interconnecting these spindles in this way, and my machine tool further includes a pair of drive means operatively connected with the main spindle and with the planetary gear carrier for the planetary gears for driving the main spindle and the planetary gear carrier at different speeds of rotation. As a result of this arrangement of my invention there is an extremely short path for the transmission of forces between the spindle for the tool carrier, in other words the main spindle, and the spindle which carries the rotary cam means, and it is possible in this way to provide for the relatively small number of components which participate in the transmission of forces dimensions large enough to make them extremely strong, even when they are situated in a limited space. In this way it is possible to achieve with the machine tool of my invention an accurate and vibration-free power transmission to the rotary tool-carrying means which carries one or more cutting tools, as referred to above.

The transmission ratio between the main spindle and the cam spindle is determined in a machine tool of the above type exclusively in accordance with the number of teeth of the sun gears and planetary gears. With the known machine tools of this type, it is possible to adapt the machine tool to different types of operating conditions only by reconstructing the machine. In other words, for this purpose parts of the known machines must be removed and replaced by other parts. Of course, it is highly desirable to be able to regulate the duration of the operating cycles in accordance with the size and configuration of the work, within a relatively large range which should be, for example, on the order of between 1 and 60 seconds. This means that the difference between the speeds of rotation of the cam spindle and the main spindle should be adjustable between, for example, 60 and 1 relative rotation each minute, assuming that for each tool-carrying lever of the tool-carrying means the cam which controls the lever has only a single camming projection. Where the speed of rotation of the main spindle is at an optimum value to provide the best possible cutting action, such as, for example, a speed of rotation of 6000 revolutions per minute, it is necessary for the absolute speed of rotation of the cam-carrying spindle to be adjustable in the region of from 5940 and 5999 revolutions per minute or in the region of from between 6060 and 6001 revolutions per minute.

It is therefore a further object of my invention to provide a machine tool in which the speed of rotation of the cam-carrying spindle is steplessly adjustable in one of these latter ranges with a high degree of accuracy, so that it will be possible with the machine of my invention to machine workpieces of different shapes and sizes in a highly accurate manner utilizing the best possible durations for the operating cycles, without requiring any disassembly of the machine and subsequent reassembly thereof with differently sized components.

In order to achieve a control of the relative speeds of rotation of this type, in a preferred construction according to my invention, the main spindle and the planetary gear carrier are driven through a pair of drive means, as pointed out above, with both of these drive means receiving their drives from a common transmission shaft, the main spindle being driven at a constant transmission ratio while the planetary gear carrier is driven through a steplessly adjustable means capable of adjusting the drive means from the common transmission shaft to the planetary gear carrier.

The particular planetary gearing which is used is capable of converting into a speed differential between the main spindle and the cam-carrier spindle the particular step-down transmission ratio achieved by way of the steplessly adjustable means in the form of a speed differential between the main spindle and the planetary gear carrier which may have a predetermined step-down transmission ratio on the order of 50:1, for example. Certain unavoidable variations of the actual output speed of rotation of the adjusting means from the nominal value will be reduced by the same ratio and have therefore no undesirable influence on the relative speeds of rotation between the cam carrying spindle and the main spindle, which determines the duration for an operating cycle. In order to regulate this latter relative speed of rotation, it is therefore possible to use a conventional adjustable drive which has an adjusting range and an adjusting accuracy which is conventional for drives of this type.

Machine tools of the above type have, in addition to the cutting tools which rotate with the rotary tool-carrying means, additional tools which have their own drives, such as, for example, additional tools carried by a rotary turret. The strokes of these latter additional tools are controlled by a rotary control shaft which operates in suitable timed relation with the operating cycles of the machine tool. This control shaft moreover influences the control of the feeding and gripping of the work. With the machine tool of my invention the speed of rotation of this control shaft must have a given relationship to the relative speed of rotation between the cam spindle and the main spindle. The speed of rotation of this control shaft must be the same as the relative speed of rotation between the main spindle and the cam spindle, when a cutting tool is actuated during rotation of the rotary tool-carrying means while there is a revolution of the tool-carrying means with respect to the rotary cam means, so that one working cycle is being carried out. If, however, during a relative revolution of the type there are instead of one camming projection several camming projections angularly displaced with respect to each other about the axis of the main spindle, and cooperating with each cutting tool, then it becomes necessary to provide for the control shaft a rotary speed which is a corresponding multiple of the relative speed between the cam spindle and main spindle.

It is therefore a further object of my invention to solve this latter problem also. The necessary synchronization is achieved in accordance with my invention by providing a subtractive planetary gearing having a pair of sun gears which respectively cooperate with the pair of drives for the main spindle and the planetary gear carrier of the above mentioned planetary gearing. This subtractive planetary gearing of my invention further includes a pair of planetary gears which mesh with each other and which respectively mesh with the sun gears of the subtractive planetary gearing, and the carrier for the planetary gears of the subtractive planetary gearing is operatively connected with the control shaft for driving the latter.

Machine tools of the above type can be used to carry out two basically different types of operations. Thus, they can be used for machining the work longitudinally thereof, so that during this type of machining the work is continuously advanced along its axis during each operating cycle. On the other hand, it is also possible to provide any desired part of the work with a predetermined profile while the work remains stationary, so that during a profiling type of machining the feeding of the work is carried out in a manner completely independent of the machining thereof. In this latter type of operation the cams which control the tool feed and the work feed come into operation sequentially, rather than simultaneously. The stepwise feeding of the work during profile machining, as referred to above, requires a predetermined time which is practically independent of the size and shape of the work. With profiling machines of this type it is therefore advisable and even conventional to use an auxiliary control shaft for the cams which control the feeding and gripping of the work, this auxiliary or secondary control shaft having its own drive which provides it with a given constant speed of rotation, and the secondary control shaft is set into operation with a control derived from the constantly rotating primary control shaft, upon completion of a given operating cycle of the machine tool. This known arrangement has the advantage of enabling the speed of rotation of the primary control shaft to be adapted to the requirements of the machining of the work, without providing an unnecessary lengthening or an unacceptable shortening of the time available for feeding and gripping the work as well as for carrying out other controls from the secondary control shaft, such as, for example, actuation of the turret head.

With known profiling machine tools of the above type, which have a secondary control shaft as well as a primary control shaft, there is however a disadvantage resulting from the fact that the primary control shaft continues to turn during operation of the secondary control shaft, and in fact through an angle which depends upon the speed of revolution of the primary control shaft, and thus, upon the time required for an operating cycle of the machine. As a result, there takes place, during operation of the secondary control shaft of the machine, a lost or wasted portion of a revolution of the primary control shaft, which depends upon the time required for an operating cycle of the machine, and used otherwise for directly controlling from the primary control shaft such operations as the advance of a transverse carriage feeding additional tools, and the like. Therefore, with the known profiling machines of this type, it is necessary to use different control cams for these movements for workpieces which require different times for the machining operations which take place during each operating cycle.

It is therefore a further object of my invention to avoid this latter drawback. This advantage is achieved with my invention by providing the machine with a clutch means capable of disconnecting the sun gear of the subtractive planetary gearing, which is driven through the drive means which includes the steplessly adjustable means, from this latter steplessly adjustable means and instead this clutch means of my invention is capable of providing a direct drive from the transmission shaft to the latter sun gear in such a way that it has the same transmission ratio as that provided for the other of the sun gears of the subtractive planetary gearing from the same transmission shaft. This construction makes it possible to stop the rotation of the primary control shaft when the secondary control shaft is started and at the same time to render the speed of rotation of the cam spindle equal to that of the main spindle so that the feeding of all of the cutting tools during rotation of the secondary control shaft is interrupted. Therefore, with my invention the extent of angular turning of the primary control shaft required for feeding of the tools is immaterial with respect to the cooperation between the primary and secondary control shafts.

My invention is illustrated by way of example in the accompanying schematic drawings which illustrate one possible embodiment of a machine tool according to my invention and in which:

FIG. 2 is a partly sectional transverse vertical elevation of the machine of FIG. 1, taken along line II—II of FIG. 1 in the direction of the arrows;

Figure 1:
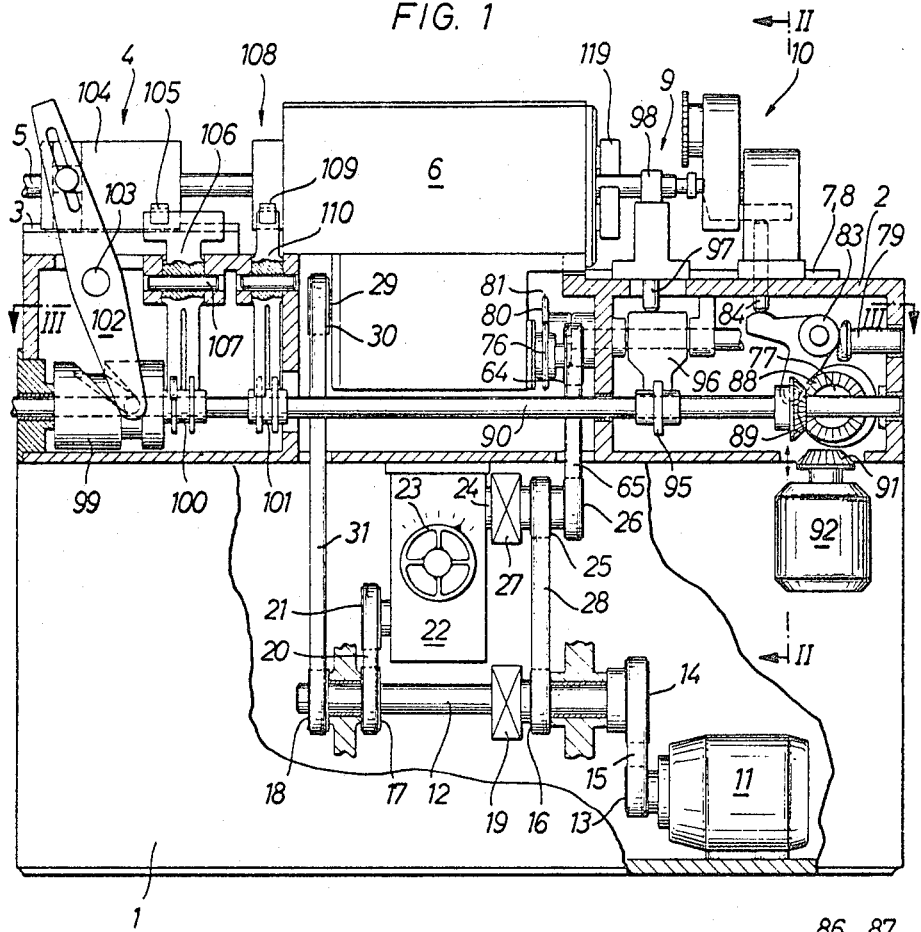
FIG. 1 is a longitudinal, sectional, vertical elevation of a machine tool according to my invention, in which several individual assemblies are only indicated.

The machine tool of my invention which is shown in the drawings includes a box-like machine frame 1 the upper side of which forms a machine table 2. The rear part of the table 2, shown at the left in FIG. 1, has a guide-way 3 extending longitudinally of the machine and being of dovetail cross section, for example, and on this guide-way 3 a work-feeding means 4 is longitudinally guided, this feeding means 4 being adapted to feed the work 5. The central portion of the machine table 2 carries a spindle stock 6 which is only schematically illustrated in FIG. 1 and which etxends partly into the machine frame 1. The front end of the table 2, shown at the right of FIG. 1, accommodates, as is apparent particularly from FIG. 3, a pair of parallel guide-ways 7 and 8 which extend longitudinally of the machine and which also have a dovetail cross section. The guide-way 7 guides for longitudinal movement a work-gripping assembly 9, while the guide-way 8 guides for longitudinal movement a circular saw assembly 10. It is also possible to mount on the front end of the table 2, which is its right end as viewed in FIG. 1, a rotary turret assembly.

The machine frame 1 accommodates in its interior an electric motor 11 which is the main driving motor for the machine tool. The motor 11 drives a transmission shaft 12 which is supported for rotary movement by suitable bearings of the machine frame, and this drive from the motor 11 to the transmission shaft 12 takes place through gears 13 and 14 which may be removed and replaced by other gears and which are only carried by the free end portions of the motor drive shaft and the transmission shaft 12, as shown at the lower right portion of FIG. 1. A toothed belt 15 extends around and meshes with gears 13 and 14 for transmitting the drive therebetween. The transmission shaft 12 carries three further gears 16, 17 and 18. The gear 16 is freely turnable on the shaft 12, but is capable of being coupled thereto for rotation therewith by means of an electromagnetic clutch 19 which forms part of the clutch means of my invention. The gear 17 is fixed to the transmission shaft 12 for rotation therewith and transmits its rotation through a toothed belt 20 to a drive gear 21 which forms the input for a steplessly adjustable drive means 22 which forms the steplessly adjustable means referred to above. The adjustment of the transmission ratio of the adjustable means 22 is provided in a known way through turning of the hand wheel 23 which carries an index capable of cooperating with a suitable scale, as indicated in FIG. 1. The adjustable means 22 has an output shaft 24 on which a pair of gears 25 and 26 are freely turnable, and these gears 25 and 26 are fixed to each other so as to form a rotary unit. While the unit 25, 26 is freely turnable on the shaft 24 it is capable of being connected thereto for rotation therewith upon energizing of an electromagnetic clutch 27 which also forms part of the clutch means of my invention. The gear 25 is connected through a toothed belt 28 with the gear 16 of the transmission shaft 12.

Figure 4:
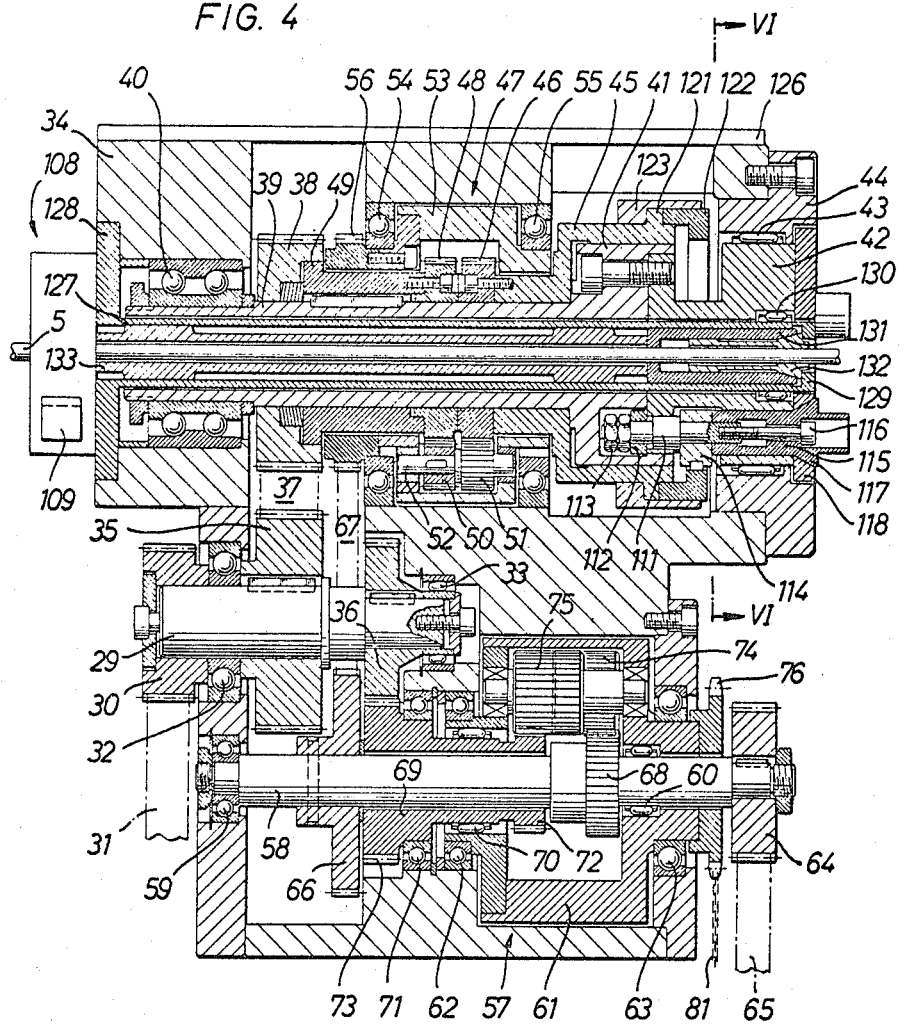
FIG. 4 is a longitudinal sectional elevation, on an enlarged scale as compared to FIG. 1, showing the details of the spindle stock of the machine.

The transmission shaft 12, moreover, is operatively connected with an intermediate shaft 29, shown in greater detail in FIG. 4, and situated in a lower portion of the spindle stock 6. The transmission between the shaft 12 and the shaft 29 takes place from the gear 18 through a toothed belt 31 which meshes with a gear 30 fixedly carried by the rotary intermediate shaft 29.

As may be seen from FIG. 4, the intermediate shaft 29 is supported for rotation in the housing 34 of the spindle stock 6 by way of roller or ball bearings 32 and 33. This intermediate shaft 29 fixedly carries a pair of additional gears 35 and 36. The gear 35 is connected by way of a toothed belt 37 with a gear 38 which is fixedly carried by the hollow main spindle 39 in the upper part of the spindle stock 6.

This main drive spindle 39 is supported for rotary movement at its rear end portion, shown at the left in FIG. 4, by way of a double-acting, or double-shouldered, thrust bearing 40, and at its front end, shown at the right in FIG. 4, the main spindle 39 has a flange 41 which is bolted to a cylindrical tool-carrying head 42 which forms part of the rotary tool-carrying means. This tool head 42 is supported for rotation by way of a needle bearing 43 at the inner periphery of a cylindrical end plate 44 of the spindle stock housing 34, this end plate 44 coaxially surrounding the tool head 42. At its exterior surface as well as outwardly of its flange 41, the main spindle 39 extends coaxially through a rotary hollow cam-carrying spindle 45 which has a rear sleeve portion of relatively small diameter slideably surrounding and engaging the main spindle 39 and which has forwardly of its rear sleeve portion a cup-shaped enlargement which is hollow and coaxially surrounds the flange 41, slideably engaging the latter.

A planetary gearing of my invention includes a sun gear 46 which is fixedly bolted to the rear end of the cam-carrying spindle 45, this sun gear 46 forming part of the planetary gearing 47 which is coaxially arranged with respect to the spindles 39 and 45. This planetary gearing 47 includes also a second sun gear 48 which is fixedly bolted onto the front end of a sleeve 49 which is fixedly mounted on the main spindle 39. The above-mentioned gear 38 is fixedly bolted to the rear end of the sleeve 49. The pair of sun gears 46 and 48 are interconnected with each other by way of a plurality of sets of planetary gears 50, 51. Only one of these sets of planetary gears is illustrated in FIG. 4. Each planetary gear set includes a pair of planetary gears 50 and 51 together with a common shaft 52 which is integral with the gear 51 and which fixedly carries the gear 50, as indicated in FIG. 4. The sun gears 46 and 48 respectively have numbers of teeth which differ from each other to only a small extent. For example, the sun gear 46 can have 49 teeth, while the sun gear 48 can have 50 teeth. The planetary gears 50 and 51, on the other hand, respectively have the same numbers of teeth. The shaft 52 is supported for rotary movement by a planetary gear carrier 53 which is supported for rotation in the spindle stock housing 34 by way of a pair of ball bearings 54 and 55. A gear 56 is fixedly threaded onto the planetary gear carrier 53.

In the lower portion of the spindle stock 6, there is, as shown in FIG. 4, a further planetary drive 57, and this is the subtractive planetary gearing of my invention. The planetary gearing 57 includes a central shaft 58 which is supported for rotation at its left end, as viewed in FIG. 4, in a ball bearing 59 carried by the spindle stock housing 34. At its right end the shaft 58 is supported for rotary movement by means of a needle bearing 60 situated within a planetary gear carrier 61 of the subtractive planetary gearing. This planetary gear carrier 61 is supported for rotary movement in the spindle stock housing 34 by means of a pair of ball bearings 62 and 63. The shaft 58 fixedly carries at its right end, as viewed in FIG. 4, a gear 64 which cooperates by way of a toothed belt 65 with the gear 26 shown in FIG. 1, so that the shaft 58 is driven from the rotary gear unit 25, 26. Thus, this shaft 58 can be driven through the adjustable means 22 and its output shaft 24. The shaft 58 drives the planetary gear carrier 53 of the upper planetary gearing 47 by way of a gear 66 which is fixed to the shaft 58 adjacent its left end, as viewed in FIG. 4. This gear 66 meshes with a toothed belt 67 which in turn meshes with the above-mentioned gear 56 which is fixed to the planetary gear carrier 53. The shaft 58 has an intermediate region provided with a gear 68 which rotates with the shaft 58, as by being formed integrally therewith, and which forms a sun gear of the subtractive planetary gearing 57.

Coaxial with the shaft 58 is a hollow shaft 69 which extends from the left into the interior of the planetary gear carrier 61, as viewed in FIG. 4. This hollow shaft 69 is supported by way of a needle bearing 70 on the planetary gear carrier 61 and is also supported for rotation by way of a ball bearing 71 carried by the spindle stock housing 34. At its ends the hollow shaft 69 is respectively provided with end gears 72 and 73. The gear 72 has the same number of teeth and the same tooth modulus as the gear 68 and forms the second sun gear of the subtractive planetary gearing 57. The gear 73 meshes with the above-mentioned gear 36 which is fixedly mounted on the shaft 29.

Figure 7:
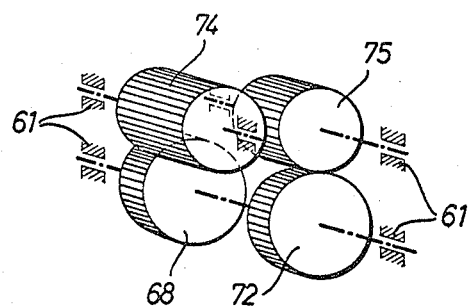
FIG. 7 is a schematic perspective illustration of details of part of a subtractive planetary gearing of FIG. 4.

Within the planetary gear carrier 61 are planetary gear sets 74, 75 which are supported for rotation and which, as shown clearly in FIG. 7, are each in the form of a pair of gears which mesh with each other, which are angularly displaced around the axis of the planetary gear carrier 61, and which in the example shown include the pair of planetary gears 74 and 75 of which the gear 74 meshes with the sun gear 68 while the gear 75 meshes with the sun gear 72. At the right end the planetary gear carrier 61, as viewed in FIG. 4, fixedly carries a sprocket wheel 76.

Figure 3:
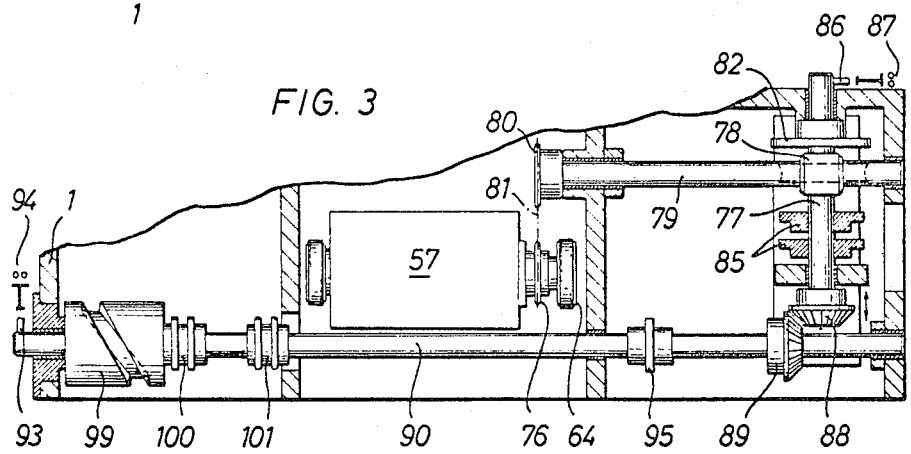
FIG. 3 is a fragmentary sectional plan view taken longitudinally of the machine along line III—III of FIG. 1 in the direction of the arrows.

As is shown in FIGS. 1 and 3, the upper right portion of the machine frame 1 supports for rotary movement a transversely extending rotary shaft 77 which is the primary control shaft of the machine tool. This shaft 77 receives its drive from a worm and worm wheel step-down transmission 78 which is driven by an intermediate shaft 79. This intermediate shaft 79 fixedly carries a sprocket wheel 80 which meshes with the roller-type of sprocket chain 81 which also meshes with the gear 76 fixed to the rotary planetary gear carrier 61, so that it is this latter gear carrier which drives the primary control shaft 77. This primary control shaft 77 carries a cam 82 which acts on a bell crank 83 turnably carried by the machine frame for vertically displacing a compression rod 84 slideably guided for movement through the machine table 2 and having its upper end engaging a control part of the circular saw assembly 10 so as to control the feeding of the circular saw blade thereof. Further cams 85 carried by the primary control shaft 77 are used for controlling the feed of an unillustrated turret or the like, which may additionally be mounted on the machine table 2. The primary control shaft 77 further carries a switch-operating projection 86 which cooperates with the electric switch 87 indicated at the upper right portion of FIG. 3.

The primary control shaft 77 is, according to FIGS. 1 and 2, connected to a further shaft 90 through a pair of bevel gears 88 and 89 which can be displaced into and out of engagement with each other, and this shaft 90 extends along the entire length of the machine frame 1. The bevel gear 89 of the shaft 90, which forms the secondary control shaft referred to above, instead of meshing with the gear 88 of the primary control shaft, can be brought into engagement with a bevel gear 91 of a braking motor 92 carried by the machine frame 1 and receiving its current through the switch 87. The secondary control shaft 90 carries a cam 93 which after each revolution of the secondary control shaft 90 actuates a switch 94 in order to interrupt the flow of current to the motor 92. In the electrical circuit of the motor 92 are also the above-mentioned electromagnetic clutches 19 and 27, and the electrical circuit is such that when the motor 92 is operating the clutch 19 is energized so that at this time the gear 16 is coupled with the shaft 12 for rotation therewith, and the clutch 27 is unenergized so that the gear unit 25, 26 is freely turnable on the output shaft 24 of the adjustable means 22. On the other hand, when the motor 92 does not operate the switching arrangement is reversed and at this time the clutch 19 is unenergized while the clutch 27 is energized so that when the motor 92 does not operate the gear unit 25, 26 rotates together with the output shaft 24 of the adjustable means 22.

The secondary control shaft 90 carries at its right portion, as viewed in FIGS. 1 and 3, a cam 95 which cooperates with an arm of a bell crank 96 (FIG. 2) supported for rotation by the machine frame. The second arm of the bell crank 96 engages the lower end of a vertically displaceable compression pin 97 so as to displace the latter vertically through the machine table 2, and during the up and down movement of the pin 97 the gripping jaws 98 of the work-gripping means 9 will be actuated in such a way that these jaws open during upward movement of the pin 97.

The left portion of the auxiliary or secondary control shaft 90, as viewed in FIGS. 1 and 3, carries a cam 99 as well as additional pairs of cams 100 and 101. The cam 99 is formed with a camming groove which receives a cam-follower pin fixedly carried by the lower end of a lever 102 supported for turning movement by a horizontal shaft 103 of the machine frame, this shaft 103 extending transversely with respect to the secondary control shaft 90. The upper end of the lever 102 extends upwardly through a suitable opening of the machine table 2 and is connected with the housing 104 of the work-feeding means 4 which is slideably guided by the guide-way 3, as pointed out above.

Within the housing 104 is an unillustrated work-gripping structure of a known type which has its opening and closing movement controlled in a known way by a rack 105. This rack 105 is guided for movement in the housing 104 transversely with respect to the feeding direction of the work 5 and at one end this rack 105 is formed with a groove which is downwardly directed and receives the upper end of a lever 106 which is supported intermediate its ends for turning movement by way of a shaft 107 carried by the machine frame. The shaft 107 extends parallel to the secondary control shaft 90 and the lower portions of the lever 106 extend around the pair of cams 100 by way of a pair of lower cam-follower members. The construction is such that each cam-follower member cooperates with its cam in such a way that the lever 106 is forced to turn in both directions about the shaft 107 in accordance with the angular position of the secondary control shaft 90.

The left end of the spindle stock 6, as viewed in FIGS. 1 and 4, carries a gripping force transmitting unit 108 which is described in greater detail below. This unit 108 is actuated by way of a transversely moving rack 109 in the same way that the above-mentioned gripping tongues of the feeding device 4 are actuated by transverse movement of the rack 105. The rack 109 is connected with the top end of a lever 110 which corresponds to lever 106. The lever 110 also has a pair of lower cam-follower members and is connected by way of the latter members with the pair of cams 101 whose angular positions are controlled by the rotation of the secondary control shaft 90.

Figure 5:
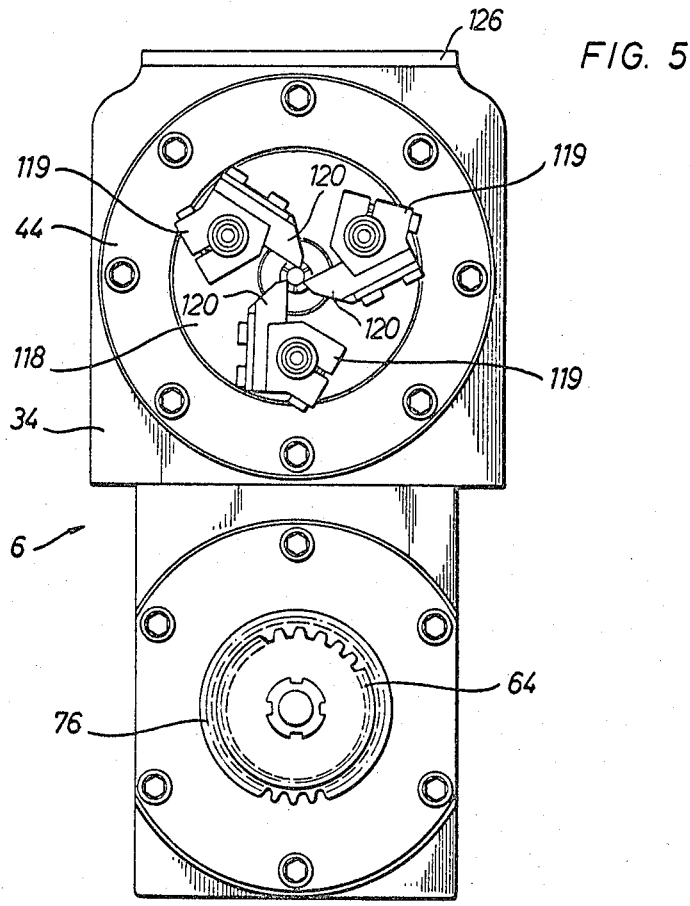
FIG. 5 is an elevational end view of the structure of FIG. 4, as seen from the right of FIG. 4.
Figure 6:
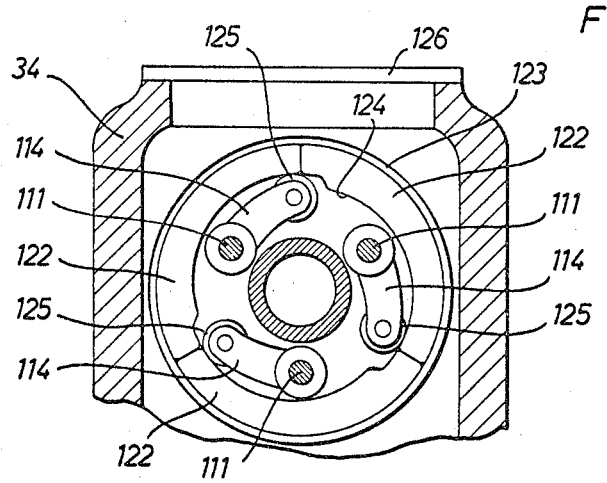
FIG. 6 is a fragmentary transverse sectional view of the structure of FIG. 4, taken along line VI—VI of FIG. 4 in the direction of the arrows.

Referring now to FIGS. 4–6, the details of the structure of my invention for the tool carrier head 42 and the rotary cam-carrying spindle 45 are shown and will now be described.

The tool head 42 accommodates in its interior three parallel cam-follower pins 111 which extend parallel to the main spindle and which are angularly distributed about the axis thereof and with respect to each other. These cam-follower pins 111 are respectively supported for rotation in a rear flange of the tool carrier head 42. At their left ends, as viewed in FIG. 4, the several cam-follower pins 111 respectively carry pressure washers 112 which press against the left end face of the tool head 42 and which are axially fixed by way of the lock nut assemblies 113, so that in this way an axial shifting of the cam-follower pins 111 to the right, as viewed in FIG. 4, is prevented. The cam-follower pins 111 pivotally carry at their right ends cam-follower levers 114, respectively, and these pins 111 also carry hollow tool-holding pins 115. The tool-holding pins 115 are fixed by screws 116 with the cam-follower pins 111, respectively, coaxially therewith, and by way of suitable end teeth the tool holder pins 115 are prevented from turning with respect to the cam-follower levers 114. The tool-holding pins 115 are respectively provided with frustoconical collars 117 received in suitable bores of frustoconical configuration formed in an end plate 118 of the tool head 42. As is shown in FIG. 5, the outer ends of the tool-holding pins 115 serve to carry tool holders 119 which are respectively clamped onto the pins 115 and which are not shown in FIG. 4 for the sake of clarity. The tool holders 119 respectively carry the cutting tools 120.

The cam spindle 45 has, as shown in FIG. 4, an outwardly directed flange or collar 121 situated adjacent its right end, and this collar 121 is engaged by three cams 122 which are identical and which are angularly distributed about the axis of the main spindle. The cams 122 are situated with their outer surfaces in engagement with the inner cylindrical surface of a sleeve 123 which extends from the left across the collar 121 and which has a shoulder engaging this collar. The cams 122 are axially threaded to the sleeve 123. The inner peripheral surfaces 124 of the cams 122 form the control cams and act, as shown in FIG. 6, on cam-follower rollers 125 which are supported for free rotary movement at the free ends of the above-described cam-follower levers 114. During rotation of the tool head 42, the centrifugal force which acts on the levers 114 maintains the rollers 125 in engagement with the cams 124.

In the embodiment which is illustrated in the drawings, the machine of my invention has three cams 124 and three rollers 125 situated in a common radial plane. This arrangement is preferred for profile machining operations. The three levers 114 are thus, during turning of the cam-carrying spindle 45 with respect to the main spindle 39 through 120°, simultaneously displaced through the same angular distances radially inwardly toward the axis of the main spindle and again radially outwardly back to their initial positions. The cutters 120 which are fixed to the levers 114 for swinging movement therewith, are thus fed through the same strokes at the same time. The feeding speed can therefore be three times as great as the feeding speed which could be achieved during profiling operations with only a single cutting tool.

When it is desired, however, to carry out longitudinally extending machining operations with the machine of my invention, it is preferred to permit the individual tool cutters carried by the rotary tool head 42 to operate independently of each other. This can be achieved if the camming portions 124 of the cams 122 are different from each other and are axially displaced with respect to each other and if also the cam-follower levers 114 are axially displaced with respect to each other in such a way that each has an individual cam controlling the same.

The interior space of the spindle stock 6 in which the cams 122 are situated is accessible for the purpose of changing the cams. For this purpose it is only necessary to remove a cover 126 which covers the entire spindle stock housing 34.

FIG. 4 shows also the structure in the interior of the hollow main spindle 39 and tool head 42 for gripping the work 5 during profile machining operations. This gripping structure includes an elongated hollow tube 127 situated in the interior of the hollow main spindle 39 and extending up to the front end of the tool head 42, the rear end of the hollow tube 127 being provided with a flange 128 which is bolted to the spindle stock housing 34. The front end of the tube 127 has an inwardly directed flange 129. In the region of its front end the tube 127 is supported by way of the needle bearing 130 which is arranged in the tool head 42. In the right portion of the holding tube 127 there is situated at its inner surface a gripping sleeve 131 of known construction which is axially shiftable in the tube 127. This sleeve 131 surrounds a collet 132 of known tubular construction. The collet 132 engages at its front end the inwardly directed flange 129 of the holding tube 127 and has a rearwardly tapered frustoconical head which cooperates with a correspondingly tapered surface of the gripping tube 131. At the inner surface of the holding tube 127 there is also a coaxially arranged pressure tube 133 which is axially shiftable. The pressure tube 133 engages at its right end, as viewed in FIG. 4, the gripping tube 131 and at its left end extends into the gripping-force transmitter 108. This transmitter 108 converts, in a known way, for example by way of suitable wedge elements or the like, axial movement of the rack 109 into axial movement of the tube 133. For example, the rack 109 can turn a gear sector in the unit 108, and the rotation of this gear sector can displace suitable wedge-shaped elements which engage suitably inclined surfaces at the left end of tube 133 in the interior of unit 108 for bringing about axial shifting of the tube 133. When the tube 133 moves to the right, the gripping sleeve 131 presses at its funnel-shaped front end against the tapered head of the collet 132, so that the inner diameter of the latter diminished and the collet grips the work 5.

When the machine of my invention is converted for use as a longitudinal machining structure, in an unillustrated manner, the gripping force transmitting unit 108 can be dispensed with. The holding tube 127 in this case, instead of being fixed to the spindle stock 6, is arranged so as to be axially shiftable within a stationary guide tube situated in the interior of the main spindle 39, this latter guide tube being fixed to the spindle stock housing 34, and in this case the left end of the tube 127 is fixed to the housing 104 of the work-feeding means 4. This work-feeding means 4 has with this embodiment no grippers of its own and cooperates together with the pressure tube 133 in such a way that the movement of the rack 105 is converted into an axial relative movement of the pressure tube 133 with respect to the holding tube 127. The additional guide tube carries at its end which is within the tool head 42 an exchangeable guide sleeve whose inner diameter is adapted to the diameter of the work.

The operation of the structure illustrated in the drawing of a profiling machine tool according to my invention is as follows:

The work 5 is derived from an unillustrated reel, and if necessary it is straightened by way of an unillustrated straightening structure and is then fed to the machine from the left so that it passes, one after the other, through the work-feeding means 4, the gripping force transmitter 108, the spindle stock 6, and the work gripping unit 9.

Assuming that a completely machined workpiece has just been separated from the work 5, the work 5 has then been shifted to the right through a distance equal to the length of one work piece, and now the feeding means 4 has been returned to its left end position. The collet 132 is closed, and the gripping jaws 98 of the unit 9 also hold the work 5. The main spindle 39 is driven by the motor 11 through the transmission shaft 12 and the intermediate shaft 29, for example at a constant speed of rotation of 4000 revolutions per minute. Clutch 19 is unenergized, while clutch 27 is energized, the planetary gear carrier 53 of the upper planetary drive 47 receives a drive from the shaft 12 through the adjustable means 22, and the shaft 58 is driven, for example at a speed of 3000 revolutions per minute.

Assuming that the sun gear 48 which rotates with the main spindle 39 has 49 teeth, and that the sun gear 46 which rotates with the cam-carrying spindle 45 has 50 teeth, then the cam-carrying spindle will fall behind the main spindle 39 by an angular distance of $1/50$ of a revolution when the planetary gear carrier 53 has turned through a single revolution with respect to the main spindle 39. The relative speed of rotation of the cam-carrying spindle 45 with respect to the main spindle 39, in this case, will therefore be:

$$(4000-3000):50=20 \text{ rev.}_{\text{rel}}/\text{min.}$$

Further assuming that the gear pairs 35–38, 36–73 and 56–66 have each a transmission ratio of 1:1, then in the subtractive planetary gearing 57 the sun gear 72 will rotate at the same speed as the main spindle, in this example at a speed of 4000 revolutions per minute, while the sun gear 68 will turn at the speed of the planetary gear carrier 53 of the upper planetary gearing 47, in this example at a speed of 3000 revolutions per minute. Because of the change in the direction of turning brought about by way of the meshing gears 36–73, the sun gears 72 and 68 turn in opposite directions. The speed of rotation of the planetary gear carrier 61 of the subtractive planetary gearing 57 is therefore equal to one half the difference between the speeds of rotation of the sun gear 72 and 68, and thus in this example $$(4000-3000):2=500 \text{ rev.}/\text{min.}$$

The rotation of the planetary gear carrier 61 is transmitted by the chain drive 76–80 to the intermediate shaft 79 and from the latter through the step-down transmission 78, in the form of a worm-and-worm wheel drive, to the primary control shaft 77.

For the purposes of simplication, it is assumed that each tool 120 carried by the rotary tool head 42 is controlled by way of only one cam 124, so that after each revolution of the cam-carrier spindle 45 with respect to the main spindle 39, a single cycle of operation of the machine has been completed. The speed of rotation of the primary control shaft 77 must in this case be equal to the relative speed of rotation between the cam-carrying spindle and the main spindle. The step-down transmission between the planetary gear carrier 61 and the primary control shaft must then be at the ratio of 25:1, which goes together with the selected stepdown transmission between the sun gears 46 and 48 of the planetary gearing 47. The speed of rotation of the primary control shaft 77 is therefore $$500:25=20 \text{ rev./min.}$$

In the event, however, that the arrangement of FIGS. 4 and 6 is such that each cutting tool 120 in the rotary tool head 42, during a revolution of the cam-carrying spindle 45 with respect to the main spindle 39, cooperate one after the other with the same cam 124, then the step-down transmission 76–80 and 78 must be chosen in such a way that the speed of rotation of the primary control shaft 77 is triple the relative speed of rotation between the cam-carrier spindle and the main spindle.

In this case, the main control spindle 77 will carry out during an operating cycle of the rotary cutting tool 120 a full revolution. During the operation of the tool 120 on the work 5, the circular saw assembly 10, controlled by the primary control shaft 77, separates from the work 5 a workpiece which has been machined during the previous operating cycle.

In the positions of operation of the bevel gears 88 and 91 shown in FIGS. 1 and 3, the control shaft 90 rotates continuously together with the primary control shaft 77. In the illustrated example where my invention is used as a profiling machine, the cams 95, 99, 100 and 101 which are carried by the secondary control shaft 90, are formed in such a way that the positions of the units controlled thereby remain unchanged during an operating cycle of the machine. After completion of the actual machining, the jaws 98 and the collet 132 are opened, while at the same time the work 5 is gripped by the feeder 4. Then the feeding means 4 shifts the work 5 to the right through a distance equal to the length of one workpiece. In its forward end position the work-feeding means 4 releases the work 5, and at the same time the jaws 98 and the collet 132 grip the work again in its new position. Finally the feeding means 4 returns to its initial rear position and a new operating cycle starts.

When the shape and size of the work during profiling operations require a relatively long operating duration for the machine, it is preferred to use the control shaft 90 as an independent secondary control shaft which does not rotate simultaneously with the shaft 77. In this case the shaft 90 is not connected with the shaft 77, but instead is coupled to the brake motor 92. During the time that the machine is actually carrying out operations on the work, the motor 92 remains unenergized and the secondary control shaft 90 remains stationary. The primary control shaft 77, however, during this main operating time of the machine, turns through a complete revolution. At the end of this revolution the switch-operating cam 86 actuates the switch 87. In this way the motor 92 is set into operation, and at the same time the clutches 19 and 27 are actuated so that the adjustable transmission means 22 is bypassed, and thus the shaft 58 together with the sun gear 68 of the subtractive planetary drive 57 are directly driven from the transmission shaft 12 and in fact at the same speeds of rotation, but in a direction of rotation opposed to that of the sun gear 72. The planetary gear carrier 61 therefore remains stationary and with it the primary control shaft 77 remains stationary. Moreover, the cam-carrying spindle 45 now turns at the same speed as the main spindle 39. All of the tool feeding movements of the machine are therefore interrupted during the revolution of the secondary control shaft 90.

After a complete revolution of the secondary control shaft 90, the cam 93 carried thereby actuates the switch 94. In this way the motor 92 and with it the secondary control shaft 90 remain stationary. At the same time the adjustable means 22 is again rendered operative in the drive of the shaft 58 and the planetary gear carrier 53. The initial operating conditions are therefore again achieved and a new operating cycle starts.

Figure 8:
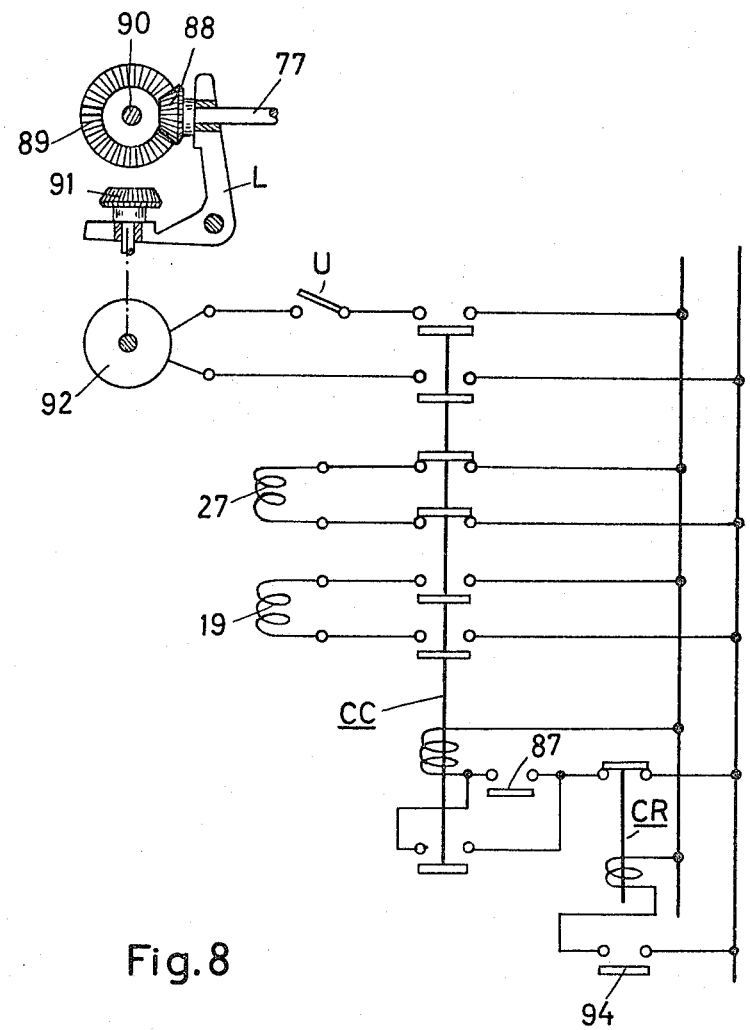
FIG. 8 is a circuit diagram relating to the same machine tool.

The circuit diagram shown in FIG. 8 relates to the operation just described. The motor 92 and the magnetic clutches 19 and 27, represented in FIG. 8 by their respective magnet coils, are controlled by a contactor CC which picks up when contact 87 closes and which drops out when a control relay CR is actuated by closing of the switch 94.

The bevel gears 88 and 91 are to be shifted manually. For this purpose, a manually operated lever L is provided which ensures that either the bevel gear 88 of the primary control shaft 77 or the bevel gear 91 of the motor 92 is brought into mesh with the bevel gear 89 of the control shaft 90. The bevel gear 88 is continuously in mesh with the bevel gear 89 if the machining time for each workpiece is relatively short, for example, if more than 25 pieces are to be produced per minute.

If, however, the workpieces to be machined require a relatively long machining time due to their shape and size, it is preferred to use the automatic lathe according to the invention in the above-described alternative manner, according to which the bevel gear 91 is continuously in mesh with bevel gear 89, and the bevel gear 88 is out of mesh.

When the bevel gear 91 is in mesh with the bevel gear 89, a switch U must be closed. This can be done either manually or by the lever L. The motor 92 then rotates the control shaft 90 by one complete revolution every time the switch 87 has been actuated by the cam 86 of the main control shaft 77. If, on the contrary, the gear 91 is out of mesh with gear 89, and the gear 88 is in engagement with the gear 89, it would be of no use if the motor 92 is caused to operate every time the switch 87 is actuated. Therefore, it is advisable that the switch U be open when the gears 88, 89 and 91 are in the position illustrated in FIGS. 1, 3 and 8. As shown in FIG. 8, the clutches 19 and 27 are actuated irrespective of the position of switch U.

I claim:

1. In a machine tool, a rotary main spindle having an axis along which a stationary workpiece is adapted to be located, rotary tool-carrying means operatively connected to said main spindle for rotation therewith and including a tool-carrying lever which rotates with said tool-carrying means and which is turnable with respect thereto about an axis parallel to said spindle axis, rotary cam means coaxial with said main spindle and cooperating with said lever for actuating the latter to displace a cutting tool carried thereby into engagement with and with respect to a stationary workpiece situated along said stationary axis during rotation of said spindle, said tool-carrying means therewith, and said cam means, a cam-carrying spindle connected with said cam means for rotating the latter, planetary means operatively connected with said spindles and including a pair of sun gears respectively fixed to said spindles and planetary gearing meshing with said pair of sun gears and providing a predetermined transmission ratio therebetween, said planetary gearing of said planetary means being carried by a planetary gear carrier of said planetary means, and a pair of drive means respectively connected operatively with said planetary gear carrier and with said main spindle for respectively driving said planetary gear carrier and said main spindle at different rotary speeds.

2. The combination of claim 1 and wherein a single transmission shaft is operatively connected with both of said drive means for transmitting a drive thereto, the drive means which drives said main spindle providing an unchanging, predetermined transmission ratio between said transmission shaft and said main spindle and the drive means which drives said planetary gear carrier from said transmission shaft including a steplessly adjustable means for adjusting the transmission ratio between said transmission shaft and said planetary gear carrier.

3. The combination of claim 2 and wherein the machine tool includes a primary control shaft for controlling the movement of various components of the machine tool, and a subtractive planetary means operatively connected with said pair of drive means and with said primary control shaft, said subtractive planetary means including a pair of sun gears respectively connected operatively with said pair of drive means so as to be connected through the latter with said main spindle and said planetary gear carrier of said first-mentioned planetary means, said subtractive planetary means further including a pair of planetary gears which mesh with each other and respectively with said sun gears of said subtractive planetary means, and said subtractive planetary means further including a planetary gear carrier which is operatively connected with said primary control shaft for driving the latter.

4. The combination of claim 3 and wherein a clutch means is operatively connected to said steplessly adjustable means and said sun gear of said subtractive planetary means which is connected with the drive means which drives said planetary gear carrier of said first-mentioned planetary means for providing a drive through said adjustable means in one position of said clutch means and for providing in another position of said clutch means a drive, bypassing said adjustable means, and directly driving said latter sun gear of said subtractive planetary means from said transmission shaft at a transmission ratio which is the same as that with which the other sun gear of said subtractive planetary gearing is driven from said transmission shaft.

References Cited

UNITED STATES PATENTS 3,128,658   4/1964   Mitchell et al. _____ 82—20

LEONIDAS VLACHOS, *Primary Examiner.*